Jan. 19, 1971  R. P. VAN DRIESEN  3,557,019
METHOD OF REGENERATING HYDROGENATION CATALST
Filed April 26, 1966
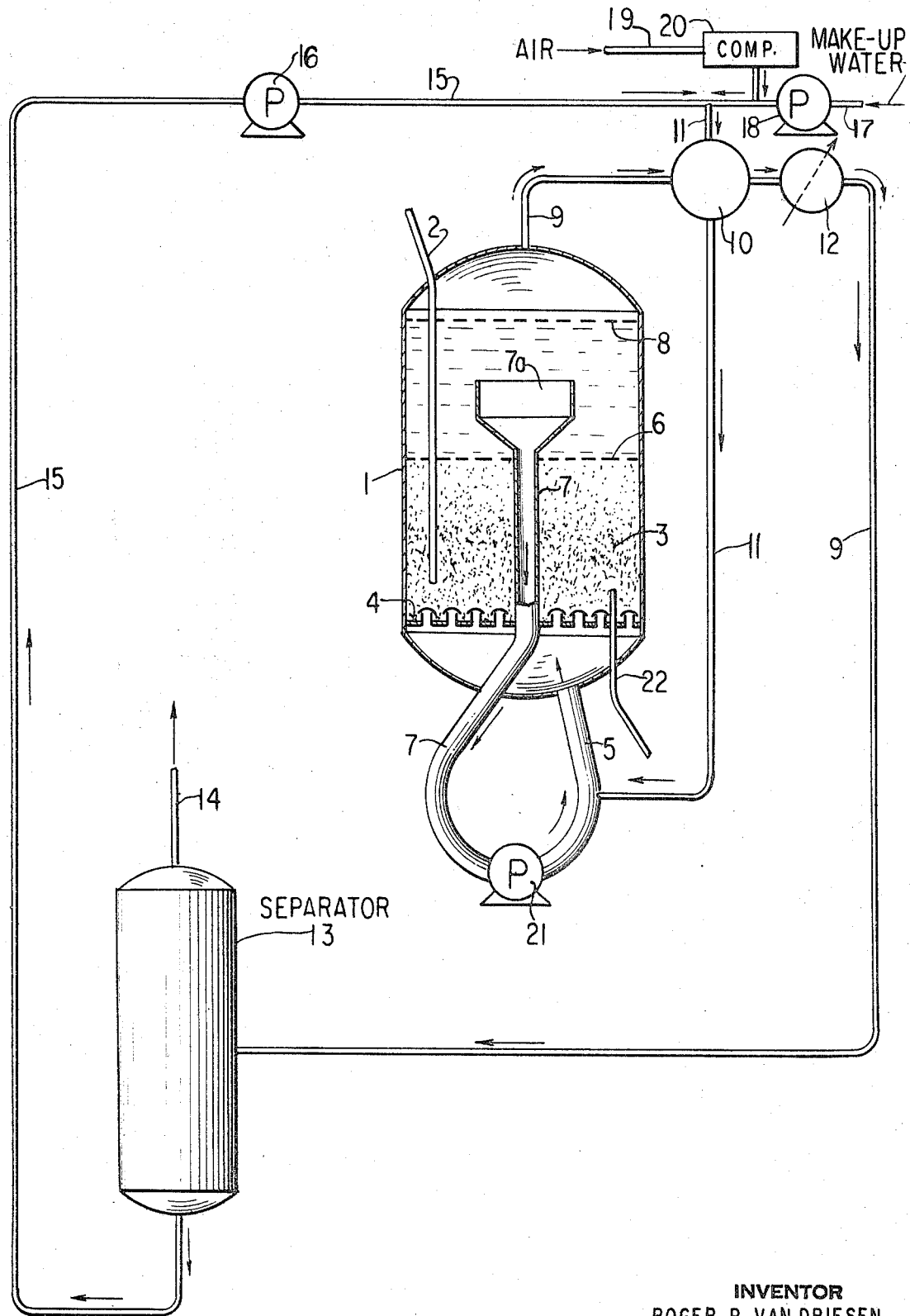
INVENTOR
ROGER P. VAN DRIESEN
BY *Norman S. Tulliam*
ATTORNEY United States Patent Office 3,557,019
Patented Jan. 19, 1971

3,557,019
METHOD OF REGENERATING HYDROGENATION CATALYST
Roger P. Van Driesen, Hopewell, N.J., assignor to Cities Service Research and Development Company, New York, N.Y., a corporation of Delaware
Filed Apr. 26, 1966, Ser. No. 545,502
Int. Cl. B01j 11/68, 11/04
U.S. Cl. 252—416                                10 Claims

ABSTRACT OF THE DISCLOSURE

Particulate hydrogenation catalyst contaminated with combustible carbonaceous deposits is regenerated by contacting the contaminated catalyst with oxygen-containing gas and water at an elevated temperature and superatmospheric pressure sufficient to maintain liquid phase water in contact with the catalyst particles.

---

This invention relates to the regeneration of catalyst, and more particularly provides an improved process for regenerating particulate hydrogenation catalysts which have become contaminated with combustible carbonaceous deposits.

Catalysts employed in the hydrogenation of liquid hydrocarbons become contaminated over a period of time with combustible carbonaceous impurities, thereby resulting in a serious decrease in the activity of the catalyst. The deposition of carbonaceous material on the catalyst is particularly pronounced in the case of catalyst used in the hydrocracking of heavy hydrocarbon oils. When the activity of the catalyst has declined to an undesirably low level, the activity of the catalyst may be restored to a considerable degree by burning the carbonaceous contaminants thereon. Heretofore, procedures for regenerating deactivated hydrogenation catalyst have generally involved contacting the catalyst particles with steam and molecular oxygen at elevated temperatures, such as above about 1200° F. Unfortunately these high temperature steam-oxygen regeneration operations sometimes result in serious side effects, such as sintering of the carrier, e.g. alumina, and sublimation or migration of the metallic components of the catalyst. Furthermore, such catalyst regeneration operations often require an unduly long period of time to restore the activity of the catalyst to the desired level. Thus, high temperature steam-oxygen regeneration operations have a number of serious drawbacks.

The process provided by my present invention for regenerating particulate hydrogenation catalyst is conducted at relatively low temperatures, whereby problems associated with high temperatures and overheating are avoided. In addition, my present invention enables combustion of carbonaceous impurities on the catalyst to proceed at a generally faster rate compared to high temperature steam-oxygen regeneration operations. The invention has various other objects and advantages, which will become apparent to those skilled in the art from the following detailed description thereof.

Briefly, my present invention contemplates regenerating particulate hydrogenation catalyst, the activity of which has become diminished through contamination with carbonaceous deposits, by contacting the contaminated catalyst with water and molecular oxygen at a super-atmospheric pressure and elevated temperature sufficient to maintain liquid phase water in contact with the catalyst particles during regeneration thereof. Under these conditions, the carbonaceous deposits on the catalyst particles are rapidly combusted and the heat of combustion is absorbed by the liquid water. The absorption by the water of the heat given off in the combustion avoids excessive temperature increase, and accordingly renders the present process particularly applicable to regeneration of relatively heat-sensitive catalyst. In addition to controlling temperature, the maintenance of liquid water in contact with catalyst particles during regeneration has the advantage of "scrubbing" a certain amount of carbonaceous material off the catalyst particles before complete combustion has occurred.

More particularly, the temperature at which the regeneration of the deactivated particulate catalyst is carried out may range up to about 700° F., which is approximately the critical temperature at which water ceases to exist in the liquid phase, irrespective of pressure. Since the heat of combustion given off by the oxidative regeneration reaction is absorbed in liquid water, thereby increasing the temperature of the water, the temperature at which the water is charged to the apparatus in which the regeneration is carried out should be sufficiently below 700° F. It will, of course, be appreciated that the extent or rate of combustion will be primarily determined by the maximum temperature reached in the regenerating operation. Thus, at contacting temperatures below about 400° F., excessively long periods of time are required to combust the carbonaceous contaminants. Accordingly, the temperature at which the regeneration is carried out may, with advantage, range from about 400° F. to about 700° F., with the range of about 500° F. to about 650° F. being particularly desirable.

The pressure at which the catalyst regeneration is carried out must be high enough to insure the presence of liquid water in contact with the catalyst particles at the operating temperature. Accordingly, depending on the temperature, pressures within the range of from about 300 p.s.i.g. to about 5,000 p.s.i.g., particularly from about 1,000 p.s.i.g. to about 4,000 p.s.i.g., may be employed. In order to insure the presence of a continuous phase of liquid water throughout substantially the entire volume of the batch of particulate catalyst being regenerated, I have found it to be desirable to select the operating temperature and pressure such that the vapor pressure of water at the operating temperature is less than about 80% of the operating pressure, preferably less than about 60% of the operating pressure.

The oxygen-containing gas employed in the present process may be substantially pure molecular oxygen, air or oxygen-enriched air. Advantageously, the regeneration operation is carried out using an oxygen partial pressure of at least about 10 p.s.i., and most preferably from about 100 p.s.i. to about 500 p.s.i.

It is not desired to limit the invention to any particular type of hydrogenation catalyst, although, as noted above, the invention is particularly useful in the treatment of heat-sensitive catalysts which undergo fundamental changes in their physical structure when regenerated in accordance with previous high temperature techniques. Thus, any particulate petroleum hydrogenation catalyst deactivated by combustible carbonaceous contaminants may be treated using my present process. By way of illustration, the more commonly employed hydrogenation catalysts include cobalt, iron, molybdenum, nickel and tungsten. Such catalysts, as well as their sulfides and oxides, may be used alone or together with other catalysts such as naturally occuring clays, etc., or in combination with each other. It is common practice to support the catalyst on suitable base such as alumina, silica, or silica-alumina.

The regeneration method contemplated by the invention may be carried out by a number of suitable procedures. However, a particularly advantageous procedure, which forms the preferred embodiment of the invention, comprises passing a mixture of oxygen and liquid water upwardly through a bed of deactivated catalyst particles at a sufficient velocity to expand the volume of the catalyst bed and cause random movement of the catalyst particles. In general, it is preferred to pass the oxygen-water mixture upwardly through the bed of deactivated catalyst at a liquid upflow velocity such that the catalyst bed is expanded between about 5% to about 300%, based on the unexpanded or settled volume of the bed. In such an expanded or ebullated bed, the catalyst particles are in a state of constant and random motion induced by the velocity of the upflowing fluid mixture. This motion enables efficient contacting of the individual catalyst particles with oxygen, and furthermore is conducive to a scrubbing action by the water on the catalyst particles to remove a certain amount of carbonaceous contaminants from the particles.

The appended drawing diagrammatically illustrates one suitable apparatus arrangement for regenerating particulate hydrogenation catalyst in accordance with the just-noted preferred embodiment.

Referring to the drawing, reference numeral 1 denotes a suitable high pressure vessel for conducting the regeneration of particulate hydrogenation catalyst deactivated by contamination with carbonaceous deposits. The regenerator 1 may be supplied either continuously or in a batch-wise manner through line 2 with deactivated hydrogenation catalyst withdrawn from a hydrogenation unit, e.g. hydrocracker, not shown. The deactivated catalyst forms a bed 3, supported on a conventional bubble cap tray 4, or other suitable means.

Liquid water, which is suitably a mixture of recycle water and make-up water, as will hereinafter be more fully described, is charged to the lower portion of regenerator 1 in admixture with a molecular oxygen-containing gas (e.g. air) through conduit 5. The water-air mixture passes upwardly through the bubble cap tray 4, and is thereby uniformly distributed through the bed of deactivated catalyst to establish a continuous liquid phase admixed with the air in contact with the catalyst particles. It will be understood that the term "continuous liquid phase" as used herein refers not only to the situation where the air is dispersed in the water, but also to the situation where the air is dissolved in the water.

The upflow velocity at which the water-air admixture is passed through the catalyst bed is such that the catalyst particles are maintained in a state of ebullation, the gross mass of the bed expanding at least 5%, and usually not greater than about 300% over the volume which it occupies in a settled state, to a fairly well-defined upper level denoted by reference numeral 6. Generally speaking, the upflow liquid velocity of the mixture is from about 5 to about 500 gallons per minute per square foot of horizontal cross-section of the expanded or ebullated mass, preferably from 20 to 120 gal./min./sq. ft. As noted above, the passage of the water-air mixture through the catalyst bed at a sufficient velocity to maintain the bed in a state of ebullation optimizes contact between the catalyst particles and the oxygen, and further enables a certain amount of carbonaceous deposits to be scrubbed from the surface of the catalyst particles prior to complete combustion thereof.

The velocity at which air or like oxygen-containing gas is passed through the regenerator may with advantage range from about 0.03 to about 0.5 ft./sec., although velocities within the range of 0.05 to 0.3 ft./sec. are particularly preferred. It will be appreciated that the gas velocity in ft./sec. is obtained from the relationship: gas volume rate (in ft.$^3$/sec.)/catalyst bed cross sectional area (in ft.$^2$).

The regenerator 1 is provided with a downwardly-extending conduit 7 having an enlarged, outwardly-flared upper portion 7a which is positioned above the upper level of the catalyst bed, and serves to disengage gas from liquid, thereby establishing a liquid-gas interface at 8. Gaseous material, including steam, carbon oxides formed by the combustion of the carbonaceous deposits and excess air, is withdrawn from the generator through conduit 9. The gaseous stream is then cooled in exchanger 10 by indirect heat exchange with a relatively cool stream of air and water charged through conduit 11. If necessary, the gaseous stream cooled in heat exchanger 10 may then be passed through a water cooler 12 to decrease the temperature thereof to less than 212° F., e.g. about 100° F. to 150° F. The cooled stream is then passed to a separation unit 13, whereby separated gases are vented through conduit 14, and liquid water is recovered through conduit 15 and recycled to conduit 11 with the aid of pump 16.

As shown in the drawing, make-up water is supplied as required through conduit 17, provided with a pump 18, and is mixed with air which is supplied through conduit 19 and compressed by compressor 20. This air-water mixture is combined with water recycled through conduit 15, and is then passed via conduit 11 to heat exchanger 10 to increase its temperature, while decreasing the temperature of the gaseous stream charged to the heat exchanger through conduit 9.

Liquid water disengaged from gas in regenerator 1 by means of the enlarged outwardly-flared member 7a is continuously withdrawn from the regenerator through conduit 7, and is returned to the regenerator through conduit 5 by means of pump 21. It will thus be seen that the total water charged to the regenerator 1 is composed of make-up water, recycle water, and water condensed from the gaseous regenerator effluent.

As previously noted, the catalyst regeneration procedure contemplated by the invention is conducted under conditions such that liquid phase water is maintained in contact with the deactivated catalyst. Accordingly, temperature and pressure conditions within the regenerator may range from about 400° F. to 700° F. and 300 p.s.i.g. to 5,000 p.s.i.g., respectively. It is particularly preferred that the regeneration be carried out at a temperature at which the vapor pressure of water is less than about 80% of the total operating pressure, preferably less than about 60% of the total opeating pressure. By this practice a continuous phase of liquid water can be maintained in contact with the catalyst. Furthermore, cooling of large quantities of steam (withdrawn from the regenerator through conduit 9) and reheating of large quantities of water (condensed from said steam and recycled through conduit 15) may be minimized. The oxygen partial pressure in the regenerator should be at least 10 p.s.i., preferably from about 100 p.s.i. to about 500 p.s.i.

The temperature of the water-air mixture charged to the regenerator through conduit 5 should, of course, be sufficiently below the critical temperature of water (i.e. about 700° F.), that the temperature is not increased above 700° F. as a result of the subsequent combustion of the carbonaceous contaminants on the catalysts. The temperature of the water introduced through conduit 5 may be suitably controlled by adjusting the temperature of the water passed through conduit 11.

A major advantage of the present invention is that the time required to regenerate a given amount of hydrogenation catalyst contaminated with a given amount of carbonaceous deposits may be markedly reduced compared to previously proposed regeneration procedures utilizing steam and air at high temperatures. Illustratively, whereas a matter of days was required utilizing the regeneration procedure process of the prior art, only a matter of hours is generally required by the present process to regenerate a given amount of deactivated catalyst.

The regenerated catalyst may be removed from the regenerator 1 through the conduit 22 and returned to the hydrogenation unit. Preferably the regenerated catalyst will contain less than about 1.5% carbonaceous material, desirably less than about 1.0%.

A more complete understanding of the invention and the advantages thereof may be had by referring to the following specific and non-limitative example:

It is desired to regenerate 50,000 lbs. of 0.025 to 0.035 inch diameter cobalt-molybdate on alumina extrudates used in the catalytic hydrogenation and hydrocracking of petroleum residuums. The deactivated catalyst has the following characteristics:

Wt. percent carbon: 18
Activity rating (percent of fresh catalyst): 53
Surface Area (m.$^2$/g.): 120

The regeneration is carried out using the apparatus arrangement shown in the drawing. Water is charged to the regenerator through conduit 5 at a total rate of 2310 gal./min., while air is passed through the regeneration zone at a velocity of 0.08 ft./sec. Liquid upflow velocity through the bed of deactivated catalyst is 60 gal./min./sq. ft. The regeneration zone is maintained at a temperature of 600° F. and a total pressure of 3,000 p.s.i.g. Partial pressure of oxygen in the regenerator is 309 p.s.i. The rate at which water is withdrawn from the regeneration zone through conduit 7 and recycled thereto through conduit 5 is 2110 gal./min. Make-up water, at a rate of 2 gal./hr., and water condensed from the effluent gas stream, at a rate of 200 gal./hr., are combined and heat exchanged with the hot effluent gas, thereby increasing the temperature of the water passed through conduit 11 to 103° F., while decreasing the temperature of the effluent gas stream to 590° F. After an operating period of 1½ hours, the temperature of the water-air admixture passed through conduit 11 is increased to 600° F. in order to maintain the desired regeneration temperature of 600° F. The regeneration process is continued after a total operating period of two (2) hours.

The regenerated catalyst has approximately the following characteristics:

Wt. percent carbon: 0.3
Activity rating (percent of fresh catalyst): 90
Surface area (m.$^2$/g.): 280

It will be noted that the regeneration process of the invention increases the activity of the catalyst to 90% that of fresh catalyst, and increases the surface area to 280 m.$^2$/g., which compares with a surface area of 325 m.$^2$/g. for the fresh catalyst and 120 m.$^2$/g. for the deactivated catalyst. Furthermore, the regeneration process reduces the carbonaceous contaminants of the catalyst from 18% to 0.3%.

By way of comparison, regeneration of 50,000 lbs. of deactivated cobalt-molybdate on alumina catalyst containing approximately 18% by weight carbonaceous deposits requires approximately ten (10) days for completion by contacting the catalyst at a temperature of 1050° F. and a pressure of 10 p.s.i.g. with 2000 s.c.f.h. of a mixture of 97.5 volume percent steam and 2.5 volume percent air. At the end of the ten (10) day operating period, the catalyst has the following characteristics:

Wt. percent carbon: 0.3
Activity rating (percent of fresh catalyst): 70
Surface area (m.$^2$/g.): 190

The lower activity rating and surface area characteristics of the catalyst regenerated by high temperature steam-air treatment compared to those characteristics of the catalyst regenerated by the present invention is due to overheating of the catalyst causing the destruction of pore structure.

While the invention has been described above in connection with certain preferred embodiments thereof, it will be understood by those skilled in the art that certain changes and modifications may be made without departing from the spirit and scope of the invention as expressed in the appended claims.

I claim:
1. Process for regenerating particulate hydrogenation catalyst contaminated with combustible carbonaceous deposits which comprises contacting said catalyst with an oxygen-containing gas and water at an elevated temperature and super-atmospheric pressure sufficient to maintain liquid phase water in contact with the catalyst particles to thereby combust at least a portion of such carbonaceous material and produce regenerated particulate catalyst having reduced amounts of carbonaceous material deposited thereon.

2. Process as in claim 1 wherein the operating temperature ranges from about 400° F. to about 700° F. and the operating pressure ranges from about 300 p.s.i.g. to about 5,000 p.s.i.g.

3. Process as in claim 2 wherein said temperature ranges from about 500° F. to about 650° F. and said pressure ranges from about 1,000 p.s.i.g. to about 4,000 p.s.i.g.

4. Process as in claim 1 wherein the partial pressure of oxygen is at least about 10 p.s.i. and the regenerated catalyst contains less than 1.5% carbonaceous material deposited thereon.

5. Process as in claim 4 wherein the partial pressure of oxygen is from about 100 to about 500 p.s.i.

6. Process as in claim 1 wherein the catalyst particles are maintained in substantially complete contact with a continuous phase of liquid water.

7. Process as in claim 2 wherein the operating temperature and pressure are so selected that the vapor pressure of water at the operating temperature is less than about 80% of the operating pressure.

8. Process as in claim 1 wherein said deactivated particulate catalyst is maintained in a bed and an admixture of said oxygen-containing gas in said water is passed upwardly through said bed at a sufficient velocity to expand the volume of said bed of deactivated catalyst and cause random movement of the catalyst particles, the catalyst particles being maintained in substantially complete contact with a continuous phase of liquid water.

9. Process of claim 8 wherein the upflow velocity of water through said catalyst bed is within the range of from about 5 to about 500 gallons per minute per square foot of horizontal cross-section of the mass of the expanded bed and is sufficient to expand the volume of the bed between about 5 and about 300%, based on its unexpanded volume, and the velocity of said oxygen-containing gas through said catalyst bed is from about 0.03 to about 0.5 ft. per second.

10. Process as in claim 1 wherein the catalyst deactivated with carbonaceous contaminants is cobalt-molybdate on alumina carrier.

References Cited
UNITED STATES PATENTS

| | | | |
|---|---|---|---|
| 3,240,718 | 3/1966 | Gatsis | 252—416 |
| 3,328,469 | 6/1967 | Spector | 260—641 |
| 2,431,455 | 11/1947 | Blanding | 23—1 |
| 3,150,105 | 9/1964 | Ledding | 252—416 |
| 3,386,922 | 6/1968 | Rothschild et al. | 252—416 |

DANIEL E. WYMAN, Primary Examiner

P. E. KONOPKA, Assistant Examiner

U.S. Cl. X.R.

23—289; 208—112; 252—420